US008106524B2

(12) United States Patent
Kamimura et al.

(10) Patent No.: US 8,106,524 B2
(45) Date of Patent: Jan. 31, 2012

(54) CAPACITOR-COMPENSATION-TYPE GENERATOR

(75) Inventors: Kenji Kamimura, Saitama (JP); Motohiro Shimizu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 375 days.

(21) Appl. No.: 12/418,059

(22) Filed: Apr. 3, 2009

(65) Prior Publication Data

US 2009/0267353 A1 Oct. 29, 2009

(30) Foreign Application Priority Data

Apr. 23, 2008 (JP) ................. 2008-112109

(51) Int. Cl.
*H02P 9/04* (2006.01)
(52) U.S. Cl. ................. 290/40 B
(58) Field of Classification Search ........... 290/40 B
See application file for complete search history.

(56) References Cited

U.S. PATENT DOCUMENTS

| 5,170,065 | A | * | 12/1992 | Shimizu et al. | 290/40 C |
| 5,558,065 | A | * | 9/1996 | Arakawa | 123/490 |
| 5,832,178 | A | * | 11/1998 | Schave | 392/472 |
| 6,278,262 | B1 | * | 8/2001 | Ullyott | 322/22 |
| 2008/0042626 | A1 | * | 2/2008 | Kamimura | 322/25 |
| 2008/0258692 | A1 | * | 10/2008 | Heinz et al. | 322/28 |

FOREIGN PATENT DOCUMENTS

| CN | 101110560 A | 1/2008 |
| JP | 63-227960 A | 9/1988 |

OTHER PUBLICATIONS

Lin Wang, et al."Design of Minitype Gas Dynamotor System Based on AVR", Journal of Chongqing University (Natural Science Edition), Feb. 28, 2006, pp. 38-40, vol. 29, Second Stage.

* cited by examiner

*Primary Examiner* — Quyen Leung
*Assistant Examiner* — Thomas Truong
(74) *Attorney, Agent, or Firm* — Arent Fox LLP

(57) ABSTRACT

In a capacitor-compensation-type generator having a rotor wound with a field winding, a stator wound with an output winding adapted to cross flux generated by the field winding to output AC power, and an internal combustion engine that drives the rotor to rotate relative to the stator, there are equipped with an actuator that changes the engine speed and an actuator controller that controls operation of the actuator in accordance with a constant voltage operation mode in which the engine speed is controlled to a desired speed such that a detected output voltage becomes a desired voltage, or a constant frequency operation mode in which the detected engine speed is controlled to a predetermined speed such that frequency of AC power outputted from the output winding becomes a desired frequency, thereby enabling to output AC power at constant voltage or frequency.

12 Claims, 5 Drawing Sheets

CAPACITOR-COMPENSATION-TYPE GENERATOR

BACKGROUND OF THE INVENTION

1. Field of the Invention

This invention relates to a capacitor-compensation-type generator and a method for controlling the same.

2. Description of the Related Art

There is known a capacitor-compensation-type generator having a rotor wound with a field winding that is short-circuited with a diode, a stator wound with an output winding that is adapted to cross the flux generated by the field winding to produce AC power and with an exciting winding that is disposed at predetermined phase angle with respect to the output winding and is short-circuited with a phase advance capacitor, and an internal combustion engine for driving the rotor relative to the stator, as taught, for example, in Japanese Laid-Open Patent Application No. Sho 63 (1988)-227960. The generator of this type is originally a brushless single-phase synchronous generator that is also called "Nonaka-type generator", named after the inventor thereof.

In this type of generator, current (whose phase is advanced by 90 degrees by the phase advance capacitor) flows through the exciting winding, field current (which is produced in the field winding by armature reaction) is rectified by the diode, and rotating field is produced by DC magnetizing the rotor (field), which is rotated by the engine, to the N-pole and S-pole. The output winding wound around the stator crosses the flux generated from the rotating field of the rotor, thereby producing AC power.

Since the capacitor-compensation-type generator does not require a brush, slip ring etc., and achieves simple structure, it causes wide spread in the low-price range. However, the output voltage increases with increasing speed of the engine and fluctuates in response to increase or decrease in load, disadvantageously resulting in unstable output voltage. Also, it is preferable for a certain load that frequency is constant, but this type of generator is not necessarily satisfactory in this regard.

SUMMARY OF THE INVENTION

An object of this invention is therefore to overcome the foregoing problem by providing a capacitor-compensation-type generator or method of controlling the same that can output AC power at constant voltage or frequency.

In order to achieve the object, this invention provides, in a first aspect, a capacitor-compensation-type generator having a rotor wound with a field winding that is short-circuited with a diode, a stator wound with an output winding that is adapted to cross flux generated by the field winding to output AC power and with an exciting winding that is disposed at predetermined phase angle with respect to the output winding and is short-circuited with a phase advance capacitor, and an internal combustion engine that drives the rotor to rotate relative to the stator, comprising: an engine speed detector that detects a speed of the engine; an output voltage detector that detects output voltage of the AC power outputted from the output winding; an actuator that changes the engine speed; and an actuator controller that controls operation of the actuator in accordance with one of a constant voltage operation mode in which the detected engine speed is controlled to a desired speed such that the detected output voltage becomes a desired voltage, and a constant frequency operation mode in which the detected engine speed is controlled to a predetermined speed such that frequency of AC power outputted from the output winding becomes a desired frequency.

In order to achieve the object, this invention provides, in a second aspect, a method of controlling a capacitor-compensation-type generator having a rotor wound with a field winding that is short-circuited with a diode, a stator wound with an output winding that is adapted to cross flux generated by the field winding to output AC power and with an exciting winding that is disposed at predetermined phase angle with respect to the output winding and is short-circuited with a phase advance capacitor, an internal combustion engine that drives the rotor to rotate relative to the stator and an actuator that changes the engine speed, comprising the steps of: detecting a speed of the engine; detecting output voltage of the AC power outputted from the output winding; and controlling operation of the actuator in accordance with one of a constant voltage operation mode in which the detected engine speed is controlled to a desired speed such that the detected output voltage becomes a desired voltage, and a constant frequency operation mode in which the detected engine speed is controlled to a predetermined speed such that frequency of AC power outputted from the output winding becomes a desired frequency.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A capacitor-compensation-type generator according to a preferred embodiment of the present invention will now be explained with reference to the attached drawings.

Figure 1:
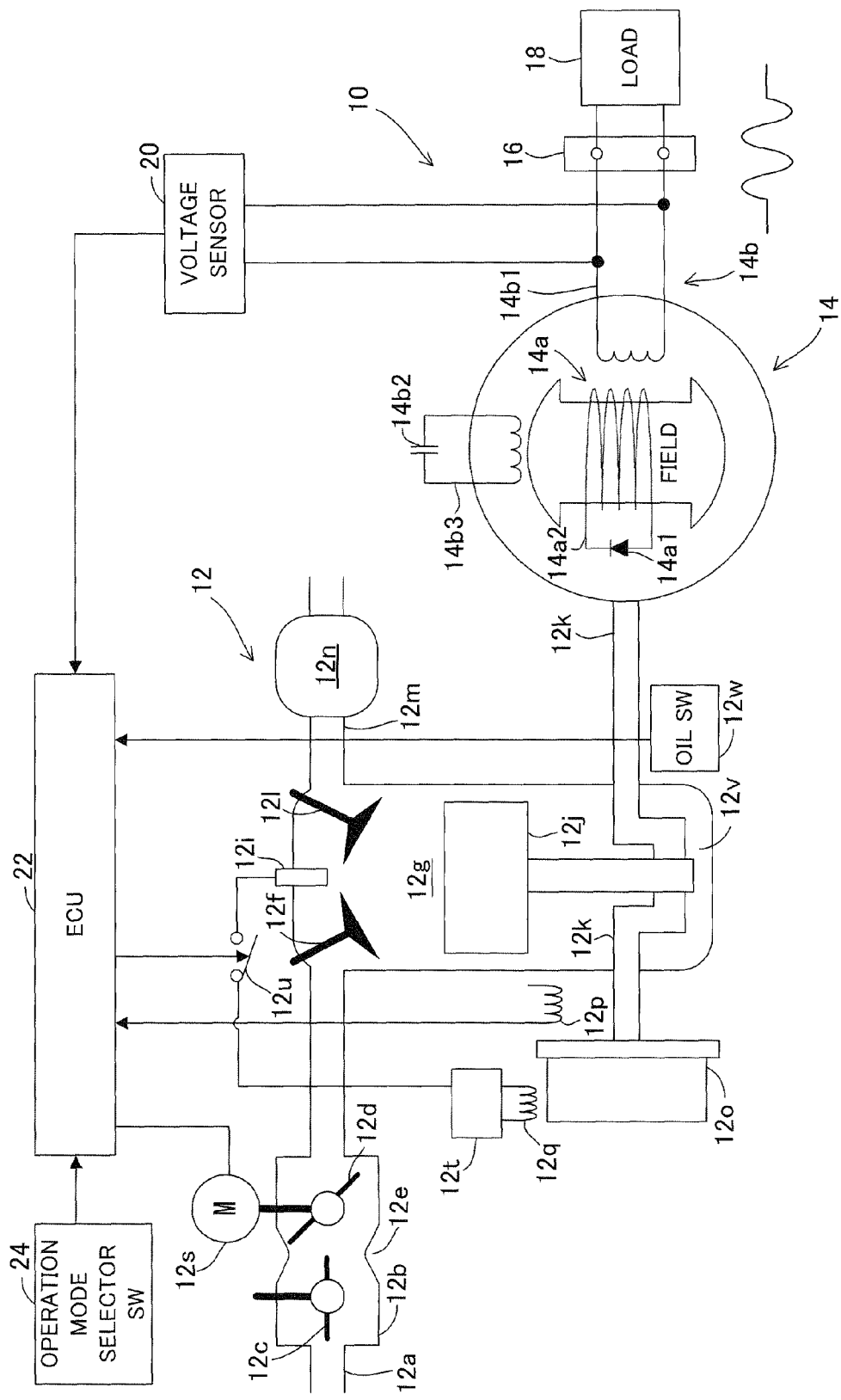
FIG. 1 is a block diagram entirely showing a capacitor-compensation-type generator according to an embodiment of the invention.

FIG. 1 is a block diagram entirely showing a capacitor-compensation-type generator according to an embodiment of the invention.

In FIG. 1, reference numeral 10 designates the capacitor-compensation-type generator that is equipped with an internal combustion engine (hereinafter called "engine"; ENG) 12 and has a rated output of AC 100V-2.1 kVA. The generator 10 is originally a brushless single-phase synchronous generator.

The engine 12 is an air-cooled, spark-ignition engine that runs on gasoline. Air sucked in through an air cleaner (not shown) flows through an intake pipe 12*a* and carburetor 12*b*. A choke valve 12*c* and throttle valve 12*d* are installed in the carburetor 12*b* to regulate the intake air.

The gasoline fuel pumped from a fuel tank (not shown) is injected through a venturi 12*e* to be mixed with the intake air and air-fuel mixture thus generated flows into a combustion chamber 12g upon opening of an intake valve 12f.

The air-fuel mixture in the combustion chamber 12g is ignited by a spark plug 12i at predetermined ignition timing and burns, thereby driving a piston 12j downward in the drawing to rotate a crankshaft 12k connected to the piston 12j. Upon opening of an exhaust valve 12l, exhaust gas caused by the combustion flows through an exhaust pipe 12m and is discharged to the exterior through a muffler 12n.

A flywheel 12o is disposed at an end of the crankshaft 12k. The inner wall of the flywheel 12o is fastened with permanent magnet pieces (not shown) and outside thereof is provided with a power generation coil 12p and exciting coil 12q that are fastened to the body of engine 12.

The throttle valve 12d is connected with an actuator (hereinafter called "throttle motor") 12s that is constituted as a stepper motor. When operated, the throttle motor 12s opens or closes the throttle valve 12d to change engine speed NE.

A power generation unit 14 is connected to the engine 12 to be operated thereby. As shown in FIG. 1, the power generation unit 14 is equipped with a rotor 14a that is connected to the other end of the crankshaft 12k of the engine 12 to be rotated with rotation of the crankshaft 12k, and a stator 14b fixed at an appropriate position of the body of the engine 12.

The rotor 14a is wound with a field winding 14a2 that is short-circuited with a diode 14a1 and the stator 14b is wound with an output winding 14b1 that is adapted to cross the flux generated by the field winding 14a2 of the rotor 14a to produce AC power and with an exciting winding 14b3 that is disposed at predetermined phase angle (electric angle), i.e., phase angle of 90 degrees with respect to the output winding 14b1 and is short-circuited with a phase advance capacitor 14b2.

In this configuration, current (whose phase is advanced by 90 degrees by the phase advance capacitor 14b2) flows through the exciting winding 14b3, field current (which is produced in the field winding 14a2 by armature reaction) is rectified by the diode 14a1, and rotating field is produced by DC magnetizing the rotor 14a, which is rotated by the crankshaft 12k of the engine 12, to the N-pole and S-pole.

Specifically, the output winding 14b1 wound around the stator 14b that faces the rotor 14a is adapted to cross the flux generated in the rotating field of the rotor 14a and produces single-phase AC power as shown at the lower portion of FIG. 1. The output winding 14b1 is connected to a load 18 through a terminal 16. A voltage sensor 20 installed at the output winding 14b1 produces an output or signal indicative of voltage outputted from the output winding 14b1.

The generator 10 is connected to an Electronic Control Unit (hereinafter simply referred to as "ECU") 22 that is constituted as a microcomputer having a CPU, ROM, RAM, I/O (input/output) and other components. An output of the voltage sensor 20 is sent to the ECU 22.

In the engine, 12, the AC power generated by the generation coil 12p is rectified by a rectification circuit (not shown) and is supplied to the ECU 22 as operating power, while voltage waveform of the AC power is shaped through a shaping circuit (not shown) and is sent to the ECU 22. Based on an output of the rectification circuit, the ECU 22 detects the engine speed NE. Thus the generation coil 12p produces the output that is synchronous with the engine speed NE.

An output of the exciting coil 12q is sent to an ignition circuit 12t to be used as power for igniting the ignition plug 12i. When it is needed to stop the engine 12, the ECU 22 opens a switch (SW) 12u to stop the ignition.

An oil switch (SW) 12w is installed near the bottom of an oil pan 12v placed below the piston 12j and outputs an ON signal when the oil (lubricant oil) level falls below a point where the oil switch 12w is installed. An output of the oil switch 12w is also sent to the ECU 22.

An operation mode selector switch (SW) 24 is installed at an appropriate position of the generator 10 to be operated by the user for selecting one of a constant voltage operation mode and a constant frequency operation mode (explained later). The switch 24 is provided with a knob for setting required voltage as a desired voltage when the constant voltage operation mode is selected, and with a switch for selecting one of commercial power source frequencies 50 Hz or 60 Hz as a desired frequency when the constant frequency operation mode is selected. An output of the operation mode selector switch 24 is also sent to the ECU 22.

Figure 2:
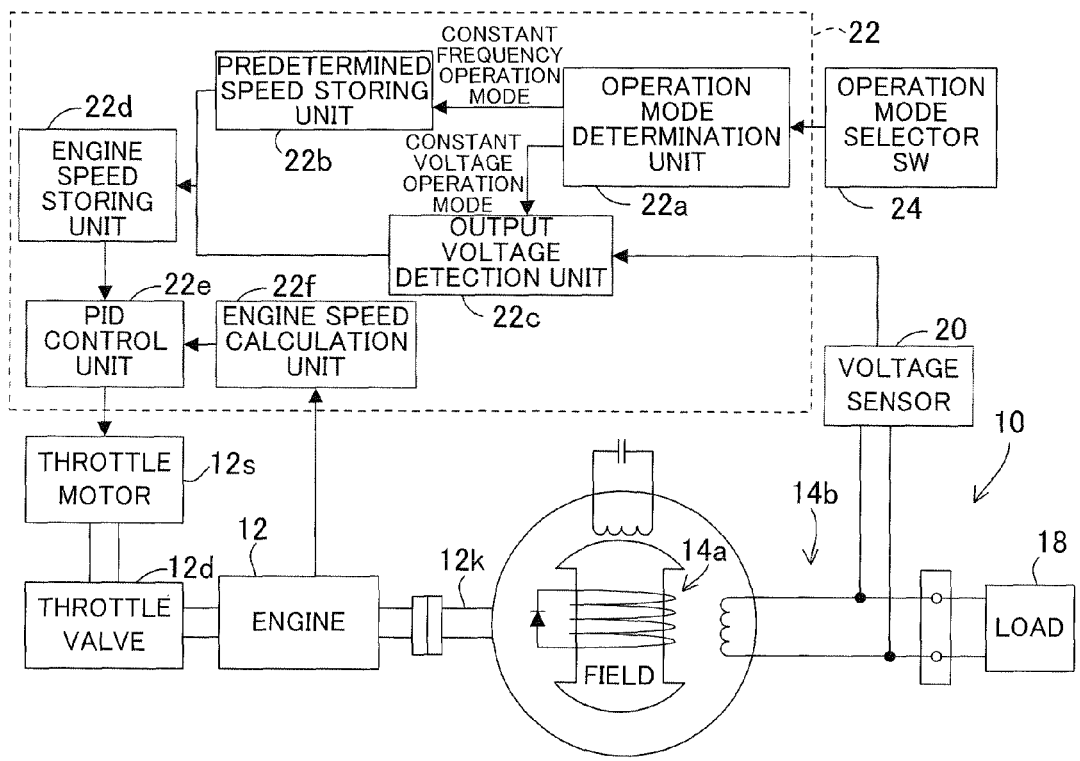
FIG. 2 is a block diagram functionally showing the operation of an electronic control unit (ECU) shown in FIG. 1.

FIG. 2 is a block diagram functionally showing the operation of the ECU 22 shown in FIG. 1. As shown, the ECU 22 includes an operation mode determination unit 22a, predetermined speed storing unit 22b, output voltage detection unit 22c, engine speed storing unit 22d, PID control unit 22e and engine speed calculation unit 22f.

Figure 3:
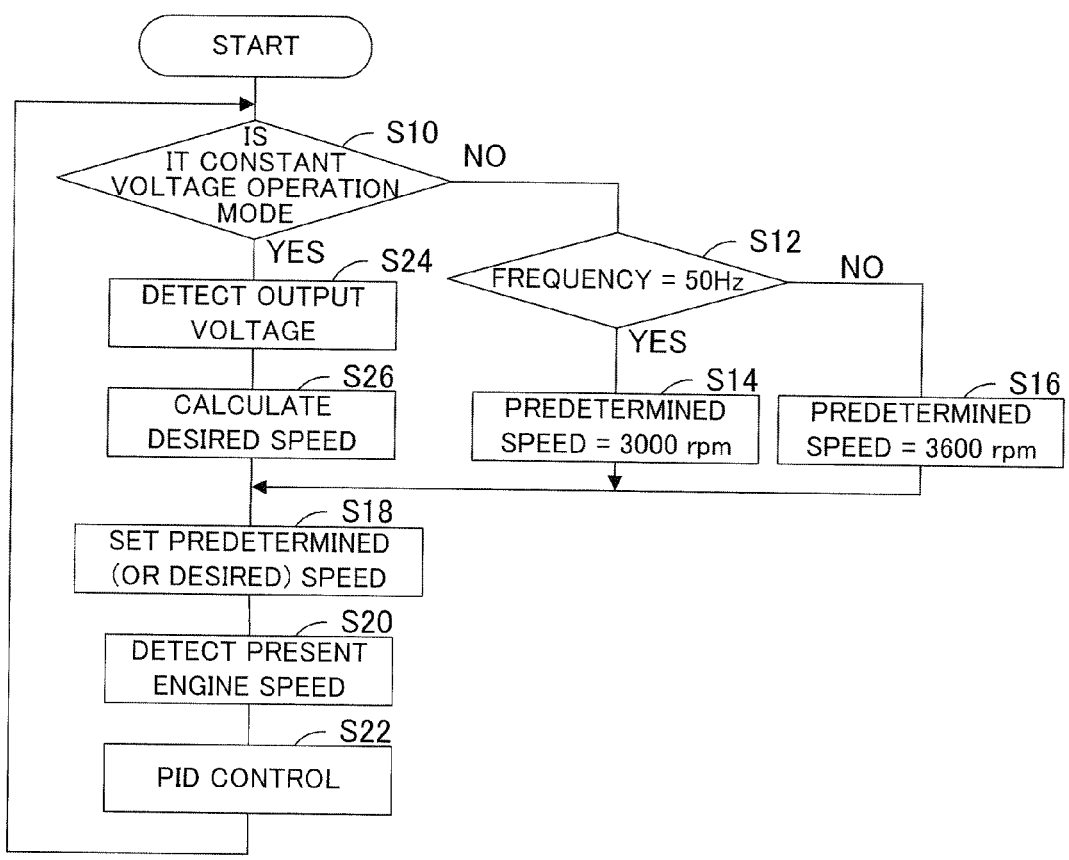
FIG. 3 is a flowchart for showing the operation of the ECU shown in FIG. 1 and FIG. 2.

FIG. 3 is a flowchart for showing the operation of the ECU 22 shown in FIG. 1 and FIG. 2.

The operation of the ECU 22 will be explained mainly referring to FIG. 3.

In S10, it is determined whether the operation mode selected by the operation mode determination unit 22a is the constant voltage operation mode, i.e., the operation mode selected by the user using the operation mode selector switch 24 is the constant voltage operation mode between the two operation modes (the constant voltage operation mode and constant frequency operation mode).

Figure 4:
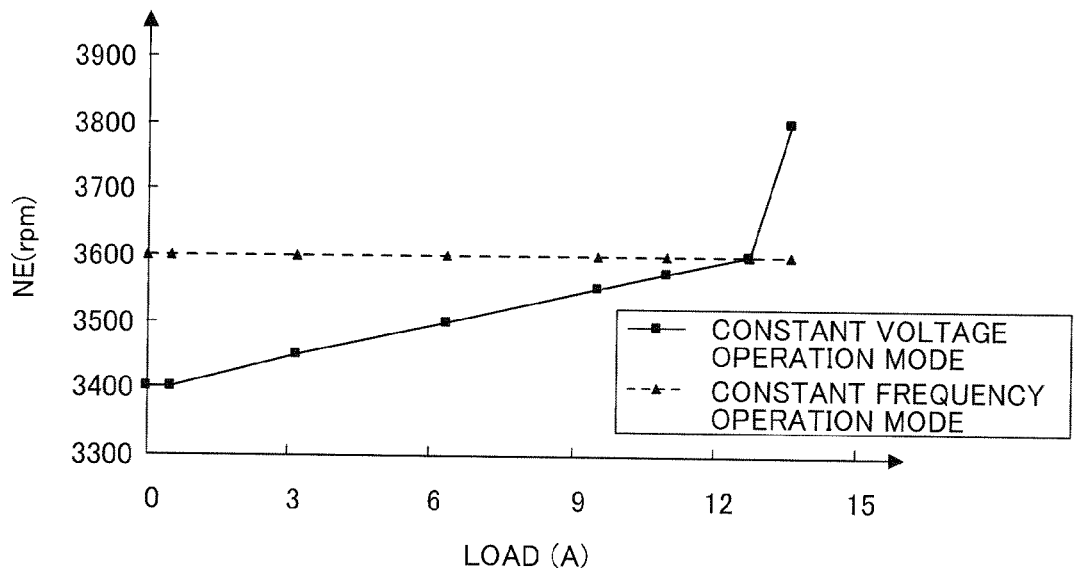
FIG. 4 is an explanatory graph showing characteristics of a constant voltage operation mode and a constant frequency operation mode conducted by the ECU shown in FIG. 1.

FIG. 4 is an explanatory graph showing characteristics of the two operation modes.

In the generator 10 according to this embodiment, two types of operation modes are prepared which includes the constant voltage operation mode in which the engine speed NE is controlled to a desired speed such that the detected output voltage becomes the desired voltage, and the constant frequency operation mode in which the engine speed NE is controlled to a predetermined speed such that the frequency of the AC power outputted from the output winding 14b1 becomes a desired frequency.

Figure 5:
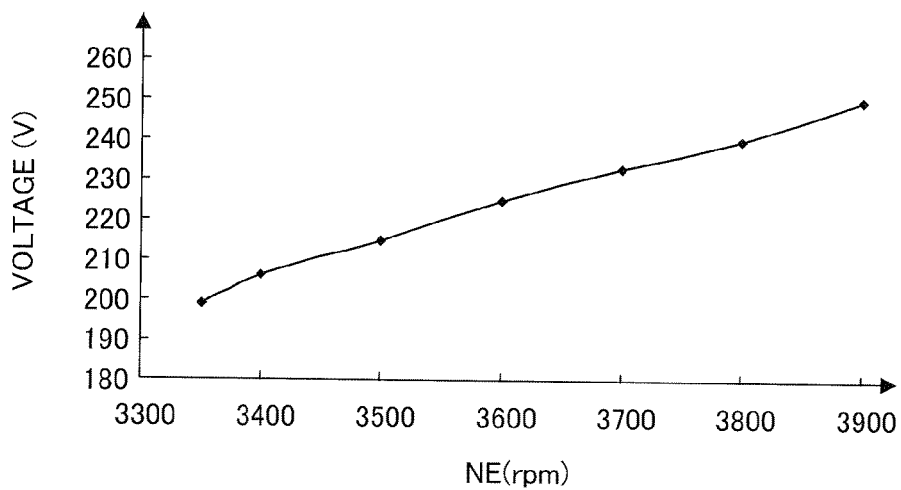
FIG. 5 is an explanatory graph showing characteristics of engine speed and output voltage of the generator with no load.
Figure 6:
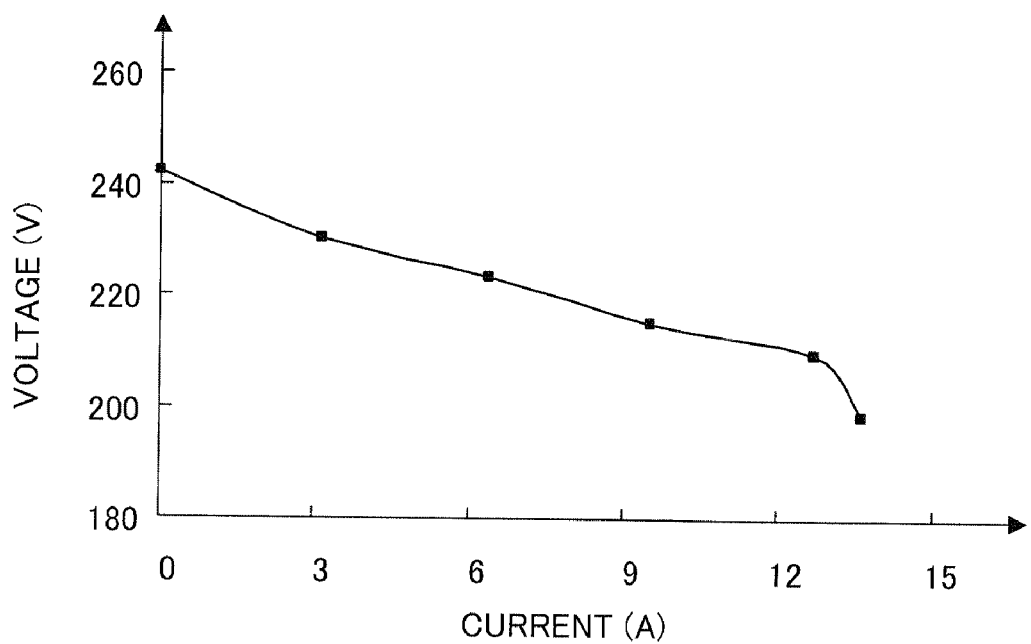
FIG. 6 is an explanatory graph showing characteristics of load and output voltage of the generator with the engine speed at 3000 rpm.

This will be further explained. As mentioned in the foregoing, since the capacitor-compensation-type generator does not require a brush, slip ring etc., and the structure is simple, it is wide spread in the low-price range. However, in a prior art capacitor-compensation-type generator, as shown in FIG. 5, the output voltage increases/decreases as the engine speed NE increases/decreases and, as shown in FIG. 6, the output voltage also fluctuates as the load increases/decreases, disadvantageously resulting in unstable output voltage. As regards the frequency, it should preferably be constant for a certain load, but this type of generator is not fully satisfactory also on the frequency.

In view of the above, this embodiment is configured such that the speed NE of the engine 12 can be changed using the throttle motor 12s and two types of operation modes are prepared to be selectable by the user.

Returning to the explanation of FIG. 3, when the result in S10 is No, meaning that the constant frequency operation mode is selected, the program proceeds to S12, in which it is determined whether the frequency of 50 Hz is selected as the desired frequency. When the result in S12 is Yes, the program proceeds to S14, in which the above-mentioned predetermined speed is determined to be 3000 rpm, while, when the result is No, proceeding to S16, in which it is determined to be 3600 rpm.

In S18, the predetermined speed is set or stored, in S20, the present engine speed NE is detected and in S22, the operation of the throttle motor 12s is PID-controlled.

Specifically, the ECU 22 controls the operation of the throttle motor 12s in accordance with the constant frequency operation mode in which the engine speed NE is controlled to the predetermined speed (fixed value: 3000 or 3600 rpm) such that frequency of the AC power outputted from the output winding 14b1 becomes the desired frequency (50 or 60 Hz).

Explaining further with reference to FIG. 2, when the constant frequency operation mode is selected by the operation mode determination unit 22a based on the user's selection, the ECU 22 selects or determines either one from two kinds of predetermined speed (fixed value) stored in the predetermined speed storing unit 22b and stores or sets the selected one in the engine speed storing unit 22d.

The ECU 22 then calculates feedback control terms including a P (proportional) term, I (integral) term and D (derivative) term based on an error between the predetermined speed and the engine speed NE calculated or detected from the output of the generation coil 12p by the engine speed calculation unit 22f, thereby driving the throttle motor 12s to open and close the throttle valve 12d so as to decrease the error.

Since, as mentioned above, the output of the generation coil 12p is synchronized with the engine speed NE, it becomes possible to detect the engine speed NE and to control frequency of the AC power outputted from the output winding 14b1 to be constant, i.e., 50 or 60 Hz regardless of variation in load, as shown in FIG. 4, by PID-controlling (feedback-controlling) the operation of the throttle motor 12s so as to decrease the error between the predetermined speed and the detected engine speed NE.

The explanation of FIG. 3 is resumed.

When the result in S10 is Yes, meaning that the constant voltage operation mode is selected, the program proceeds to S24, in which the output voltage is detected, to S26, in which the desired speed is calculated, and to S18 onward, in which the throttle motor 12s is driven in accordance with the constant voltage operation mode in which the engine speed NE is controlled to the desired engine speed such that the detected output voltage becomes the desired voltage.

Explaining further with reference to FIG. 2, when the constant voltage operation mode is selected by the operation mode determination unit 22a based on the user's selection, the ECU 22 detects the output voltage in the output voltage detection unit 22c to calculate the desired speed and stores or sets the calculated speed in the engine speed storing unit 22d.

The desired voltage in the constant voltage operation mode is a value set by the user. When the constant voltage operation mode is selected and the desired voltage is set, the PID control unit 22e calculates the desired engine speed so that the detected output voltage converges to the desired voltage. Based on an error between the desired engine speed and the detected engine speed NE, the PID control unit 22e calculates the feedback control terms including the P (proportional) term, I (integral) term and D (derivative) term, thereby driving the throttle motor 12s to open and close the throttle valve 12d so as to decrease the error.

Thus, since the desired engine speed is calculated so as to converge the detected output voltage to the desired voltage and the feedback control terms including the P (proportional) term, I (integral) term and D (derivative) term are calculated based on the error between the desired engine speed and detected engine speed NE, for PID-controlling or feedback-controlling the throttle motor 12s to decrease the error, as shown in FIG. 4, it becomes possible to control voltage of the AC power outputted from the output winding 14b1 to be constant regardless of variation in load.

As stated above, the embodiment is configured to have a capacitor-compensation-type generator (10) (or method to control the same) having a rotor (14a) wound with a field winding (14a2) that is short-circuited with a diode (14a1), a stator (14b) wound with an output winding (14b1) that is adapted to cross flux generated by the field winding to output AC power and with an exciting winding (14b3) that is disposed at predetermined phase angle with respect to the output winding and is short-circuited with a phase advance capacitor (14b2), and an internal combustion engine (12) that drives the rotor to rotate relative to the stator, comprising: an engine speed detector (power generation coil 12p, ECU 22, engine speed calculation unit 22f, S20) that detects a speed of the engine (NE); an output voltage detector (voltage sensor 20, ECU 22, output voltage detection unit 22c, S24) that detects output voltage of the AC power outputted from the output winding; an actuator (stepper motor 12s) that changes the engine speed; and an actuator controller (ECU 22, PID control unit 22e, S22) that controls operation of the actuator in accordance with one of a constant voltage operation mode in which the detected engine speed NE is controlled to a desired speed such that the detected output voltage becomes a desired voltage (S10 to S16), and a constant frequency operation mode in which the detected engine speed is controlled to a predetermined speed such that frequency of AC power outputted from the output winding becomes a desired frequency (S24 to S26). With this, the voltage or frequency of the outputted AC power can be made constant.

Specifically, in the case of the constant voltage operation mode, the AC power at constant voltage which is required by the user can be outputted regardless of increase or decrease in load, and in the case of the constant frequency operation mode, the AC power at constant frequency can be outputted regardless of variation in load. Further, the engine speed NE is controlled to be low under low load in the constant voltage operation mode, thereby enhancing fuel efficiency and improving environmental friendliness due to lowered noise level.

The generator (or the method of controlling the same) further includes: an operation mode selector switch (24) adapted to be operated by an user for selecting one of the constant voltage operation mode and the constant frequency operation mode, and the actuator controller controls operation of the actuator in response to the operation mode selected through the operation mode selector switch by the user. With this, in addition to the above-mentioned effects, it becomes possible to follow the user's intention well.

In the generator (or the method of controlling the same), the desired voltage used in the constant voltage operation mode is set by the user and the actuator controller calculates the desired speed such that the detected output voltage converges to the desired voltage when the constant voltage operation mode is selected (S10, S24, S26). With this, in addition to the above-mentioned effects, it becomes possible to output the AC power at constant voltage which is required by the user regardless of increase or decrease in load, thereby enabling to follow the user's intention furthermore.

In the generator (or the method of controlling the same), the predetermined speed used in the constant frequency operation mode is a fixed value set based on the desired frequency and the actuator controller controls the detected speed to the fixed value when the constant frequency operation mode is selected (S10 to S22). With this, in addition to the above-mentioned effects, it becomes possible to output the AC power at constant frequency further reliably.

Japanese Patent Application No. 2008-112,109 filed on Apr. 23, 2008, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A capacitor-compensation-type generator having a rotor wound with a field winding that is short-circuited with a diode, a stator wound with an output winding that is adapted to cross flux generated by the field winding to output AC power and with
    an exciting winding that is disposed at predetermined phase angle with respect to the output winding and is short-circuited with a phase advance capacitor, and an internal combustion engine that drives the rotor to rotate relative to the stator, comprising:
        an engine speed detector that detects a speed of the engine;
        an output voltage detector that detects output voltage of the AC power outputted from the output winding;
        an actuator that changes the engine speed;
        an actuator controller that controls operation of the actuator in accordance with one of a constant voltage operation mode in which the detected engine speed is controlled to a desired speed such that the detected output voltage becomes a desired voltage, and a constant frequency operation mode in which the detected engine speed is controlled to a predetermined speed such that frequency of AC power outputted from the output winding becomes a desired frequency; and
        an operation mode selector switch adapted to be operated by a user for selecting one of the constant voltage operation mode and the constant frequency operation mode.

2. The generator according to claim 1,
    wherein the actuator controller controls operation of the actuator in response to the operation mode selected through the operation mode selector switch by the user.

3. The generator according to claim 1, wherein the desired voltage used in the constant voltage operation mode is set by the user and the actuator controller calculates the desired speed such that the detected output voltage converges to the desired voltage when the constant voltage operation mode is selected.

4. The generator according to claim 1, wherein the predetermined speed used in the constant frequency operation mode is a fixed value set based on the desired frequency and the actuator controller controls the detected speed to the fixed value when the constant frequency operation mode is selected.

5. The generator according to claim 1, wherein the actuator controller PID-controls operation of the actuator such that an error between the detected engine speed and the desired or predetermined speed decreases.

6. The generator according to claim 1, wherein the actuator comprises a stepper motor.

7. A method of controlling a capacitor-compensation-type generator having a rotor wound with a field winding that is short-circuited with a diode, a stator wound with an output winding that is adapted to cross flux generated by the field winding to output AC power and with an exciting winding that is disposed at predetermined phase angle with respect to the output winding and is short-circuited with a phase advance capacitor, an internal combustion engine that drives the rotor to rotate relative to the stator and an actuator that changes the engine speed, comprising the steps of:
    detecting a speed of the engine;
    detecting output voltage of the AC power outputted from the output winding;
    controlling operation of the actuator in accordance with one of a constant voltage operation mode in which the detected engine speed is controlled to a desired speed such that the detected output voltage becomes a desired voltage, and a constant frequency operation mode in which the detected engine speed is controlled to a predetermined speed such that frequency of AC power outputted from the output winding becomes a desired frequency; and
    selecting an operation mode by a user for selecting one of the constant voltage operation mode and the constant frequency operation mode.

8. The method according to claim 7,
    wherein the step of actuator controlling controls operation of the actuator in response to the operation mode selected through the operation mode selector switch by the user.

9. The method according to claim 7, wherein the desired voltage used in the constant voltage operation mode is set by the user and the step of actuator controlling calculates the desired speed such that the detected output voltage converges to the desired voltage when the constant voltage operation mode is selected.

10. The method according to claim 7, wherein the predetermined speed used in the constant frequency operation mode is a fixed value set based on the desired frequency and the step of actuator controlling controls the detected speed to the fixed value when the constant frequency operation mode is selected.

11. The method according to claim 7, wherein the step of actuator controlling PID-controls operation of the actuator such that an error between the detected engine speed and the desired or predetermined speed decreases.

12. The method according to claim 7, wherein the actuator comprises a stepper motor.

* * * * *